Oct. 15, 1963 M. E. HARDY 3,107,098

PHONOGRAPH

Filed March 26, 1957 6 Sheets-Sheet 1

INVENTOR.
Maurice E. Hardy
BY John J. Pederson
Attorney

INVENTOR.
Maurice E. Hardy
BY John J. Pederson
Attorney

INVENTOR.
Maurice E. Hardy
BY John J. Pederson
Attorney

INVENTOR.
Maurice E. Hardy
BY John J. Pederson
Attorney

INVENTOR.
Maurice E. Hardy
BY John J. Pederson
Attorney

PHONOGRAPH

Filed March 26, 1957

INVENTOR.
Maurice E. Hardy
BY John J. Pederson
Attorney

United States Patent Office 3,107,098 Patented Oct. 15, 1963

3,107,098
PHONOGRAPH

Maurice E. Hardy, Chicago, Ill., assignor to Zenith Radio Corporation, a corporation of Delaware Filed Mar. 26, 1957, Ser. No. 648,713
15 Claims. (Cl. 274—10)

This invention relates to record players and more particularly to record players which provide for automatic record changing operation.

The present state of the record disc art confronts one with such a variety of offerings (7, 10 and 12 inch diameter discs for operation at 16, 33⅓, 45 or 78 r.p.m.) that complex multi-speed phonographs are required for reproducing the same. In light of this situation it was inevitable that the advantages as well as the shortcomings of the various record discs would, through public usage, determine a pattern reflecting the preferences of the public. It appears that interest in the traditional, small-aperture 78 r.p.m. discs is static, if not waning, in comparison to the increased acceptance accorded the enlarged indexing aperture 45 r.p.m. record discs which are also primarily utilized for recording the "popular" musical works. The large-aperture disc is more readily adaptable to simplified automatic record playing apparatus which undoubtedly accounts for a measure of its success. On the other hand, 33⅓ long playing recordings with small indexing apertures are admittedly more popular among those desiring classical or semi-classical music, and have the advantage of providing extended and uninterrupted programming.

There has been observed a tendency on the part of record disc enthusiasts to employ, in general, automatic record changing apparatus primarily in conjunction with the 45 r.p.m. discs, while utilizing manual play phonograph equipment in the reproduction of long play recordings. This predisposition toward manual operation in conjunction with long play records stems largely from an apprehension on the part of many to subject expensive recordings to the increased wear which generally accompanies automatic record changing operation.

In the furtherance of an acceptable device which fulfills the requirements outlined above, novel record changing apparatus is described in my copending applications Serial No. 503,460, filed April 25, 1955, now Patent No. 2,918,289, and Serial No. 620,925, filed November 7, 1956, both of which are assigned to the present assignee. Generally speaking, both applications describe automatic record playing apparatus utilizing an enlarged spindle for indexing and dispensing the 45 r.p.m. discs, which spindle is bodily retractable below the turntable surface. These devices also obviate the nuisance of the demountable 45 r.p.m. adaptor spindle which is prone to misplacement as well as to malfunction from repeated handling.

The apparatus disclosed in the above-mentioned copending applications however, admit of some limitations to incorporation in portable record players. It is a prime consideration in the design of portable phonographic equipment to reduce the size and weight of the apparatus and, of course, the cost. The lateral displacement of the turntable and tone arm pivotal points, which is primarily governed by the radius of the largest record disc to be accommodated, defines to a large degree the transverse dimensions of a portable unit while the depth or thickness is determined by the motor, the speed changing apparatus, and the audio amplifying requirements. The last mentioned components, due to modern techniques, are easily designed to permit space saving construction. Thus the controlling parameter relative to the thickness of a portable record player, would be the storage space requirements for the automatic spindle when retracted.

It is a primary object of this invention to provide a new and improved automatic record player having a retractable self-storing record changing spindle structure.

It is a further object of this invention to provide a new and improved record player which provides for automatic playing of large-aperture recordings and manual playing of all types of commercially available record discs.

It is also an object of this invention to provide novel means for indexing and sequentially dispensing record discs to a phonograph turntable.

Furthermore, it is an object of the invention to assimilate the foregoing objectives in a compact portable record player amenable to economic production techniques.

In accordance with the invention, a phonograph for reproducing information from record discs comprises a rotatable turntable having a record supporting surface which is provided with a recess. The phonograph includes a record changing assembly including a spindle structure pivotally mounted to rotate about an axis that is parallel to the record supporting surface and retracts within the recess. Contained within the spindle structure are record supporting and dispensing elements for storing record discs above the turntable and for individually dispensing them onto the record supporting surface. The invention further contemplates an automatic phonograph for alternatively reproducing information from record discs of a first type characterized by a small indexing aperture of a second type characterized by a large indexing aperture. This automatic phonograph comprises a rotatable turntable unit which has a record supporting surface provided with a plurality of radially extending recesses, and includes a record changing assembly including an automatic large-diameter spindle which stores second type record discs above the turntable and which individually dispenses such discs onto the record supporting surface. The afore-mentioned spindle comprises a corresponding plurality of pivotally mounted separate sections centrally disposed with respect to the turntable unit. The sections are respectively retractable within the above-mentioned recesses and are extendable to an operative position above the record supporting surface. Additional indexing means are provided, comprising a small-diameter spindle which is coaxially fixed to the turntable unit and is encompassed by the automatic spindle when the spindle sections are extended to the operative position. This small diameter spindle indexes small-aperture record discs when the separate sections are retracted within the recesses. Furthermore, auxiliary indexing means comprising depressable indexing pins can be employed for manually indexing second type record discs.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
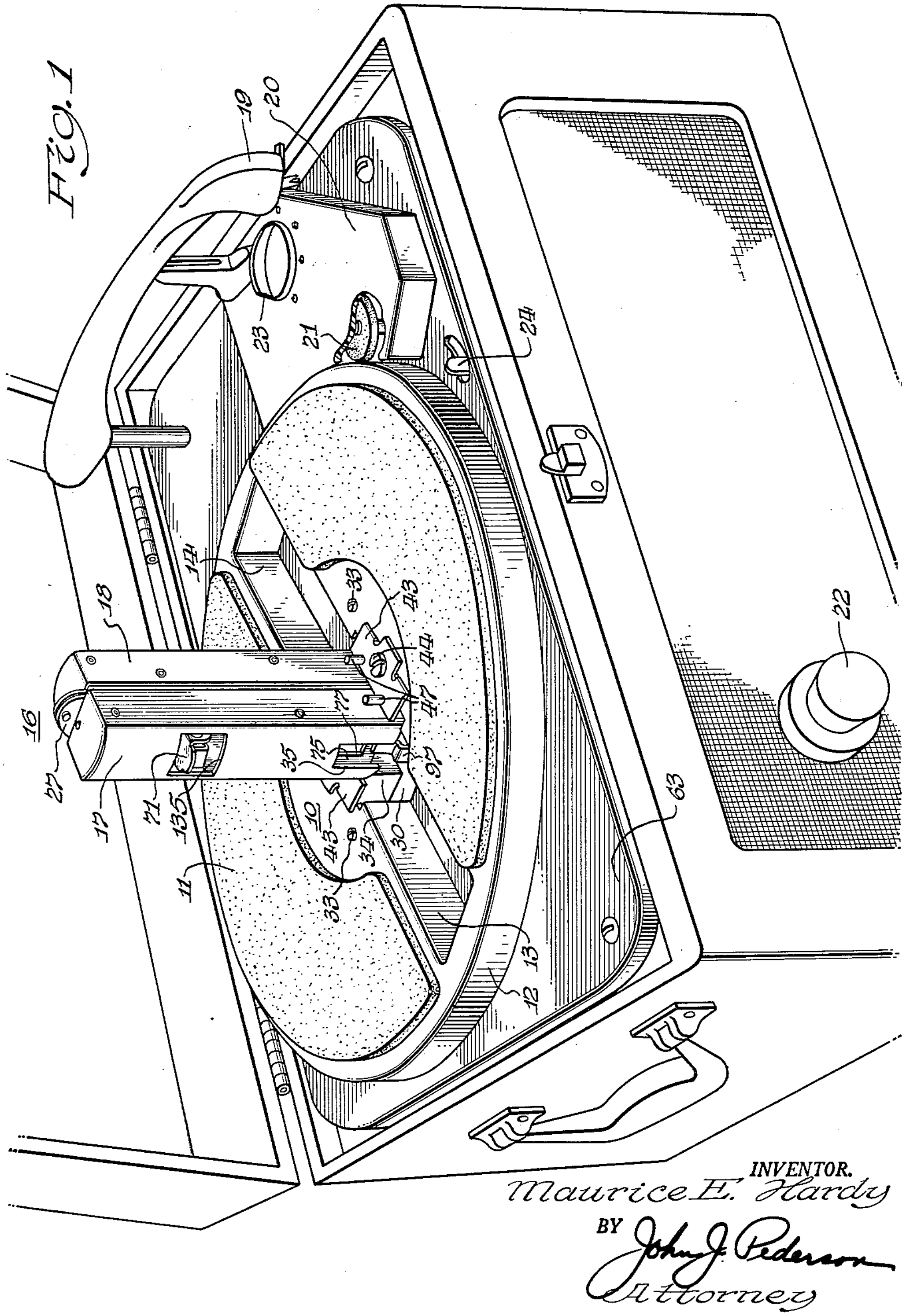
FIGURE 1 is a perspective view of a portable record player embodying the invention.

In FIGURE 1, a portable record player embodying the invention comprises a rotatable turntable unit 10 having a record supporting surface 11, which can be composed of cork or other resilient material, disposed upon a platen 12 provided with a pair of radially extending recesses 13, 14. A record changing assembly 15 (shown in FIGURE 4), for indexing and automatically dispensing large-aperture record discs, includes an automatic spindle arrangement 16 centrally disposed with respect to turntable unit 10, and comprising a pair of pivotally mounted separate sections 17, 18. The record player further incorporates a tone arm 19 and a speed changing mechanism 20 operably coupled to turntable unit 10 through a driving disc 21 and disposed upon the mounting base 63. A power switch and volume control 22, a speed selector 23 and a reject toggle 24 comprise the external controls of the record player.

Figure 2:
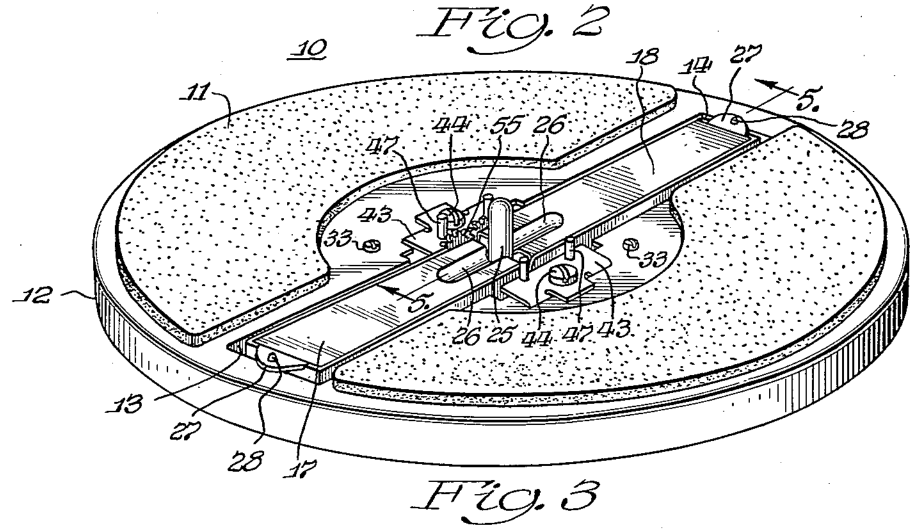
FIGURE 2 is a perspective view of the turntable unit with the automatic spindle in retracted position.

FIGURE 2 shows sections 17, 18 retracting within recesses 13, 14 respectively, thereby revealing a small diameter spindle 25 which is fixed to turntable unit 10 and is within the relieved portions 26 of sections 17, 18 upon upending of sections 17, 18. The extremities of sections 17, 18 are provided with lifting ears 27 which include stop buttons 28.

Figure 3:
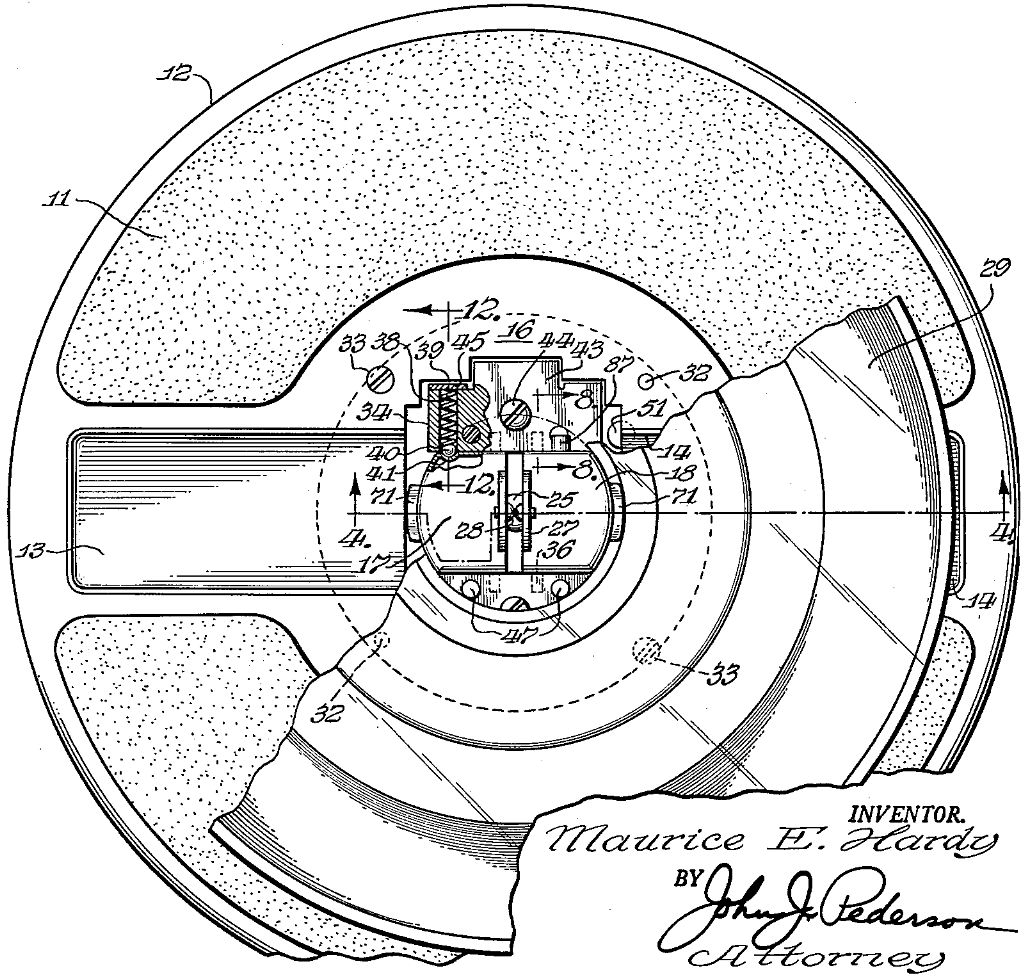
FIGURE 3 is a fragmentary plan view, partly in section, of the turntable unit with the automatic spindle extended to its operative position, and illustrating a record disc disposed in playing position.

FIGURE 3 depicts the turntable unit 10 with sections 17, 18 extended in an upright position to constitute the automatic spindle arrangement 16. A record disc 29 (fragmentarily shown) is disposed upon record-supporting surface 11.

Figure 4:
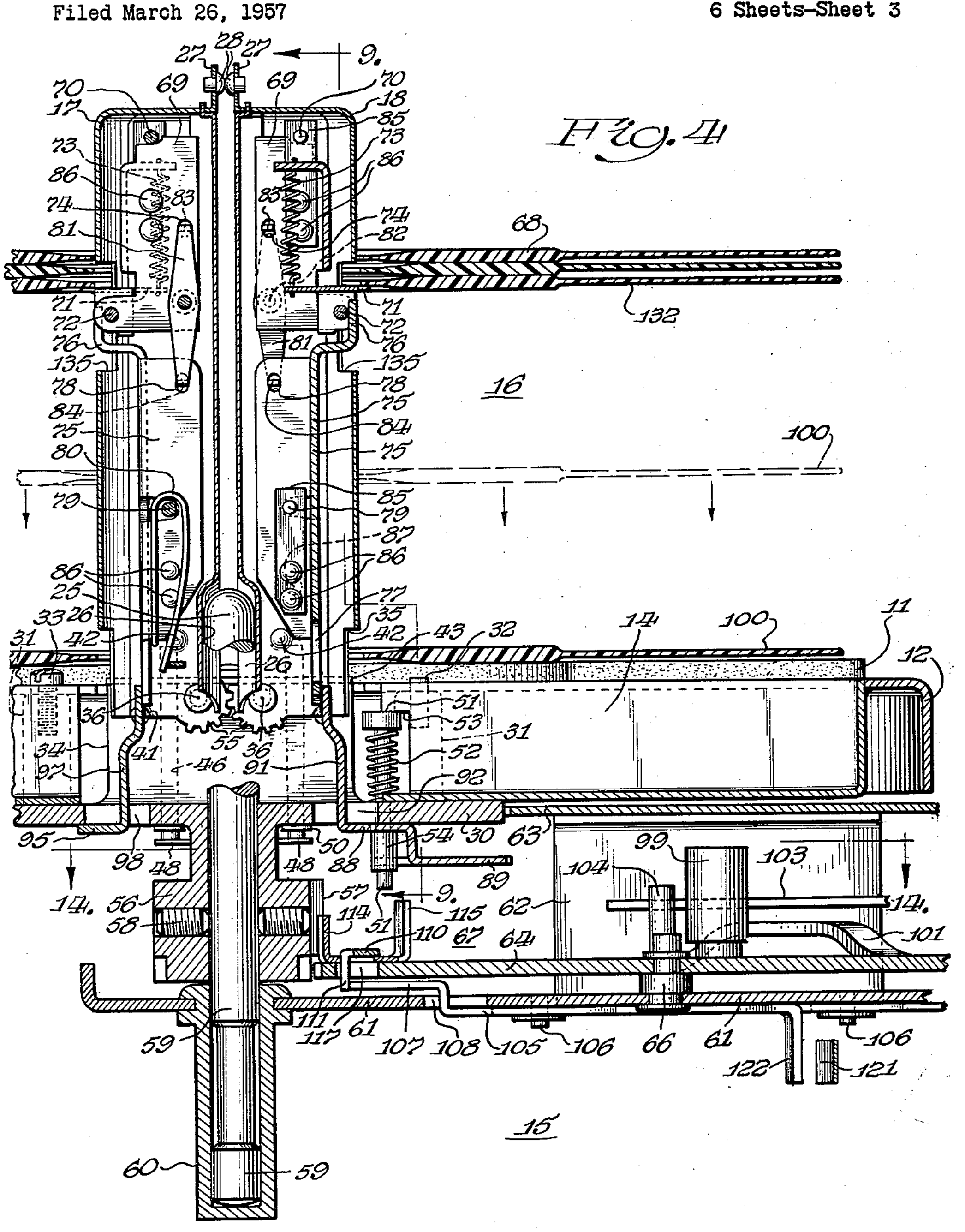
FIGURE 4 is a fragmentary cross-sectional view taken along the line 4—4 of FIGURE 3.
Figures 9, 10, 11, 12, 13:
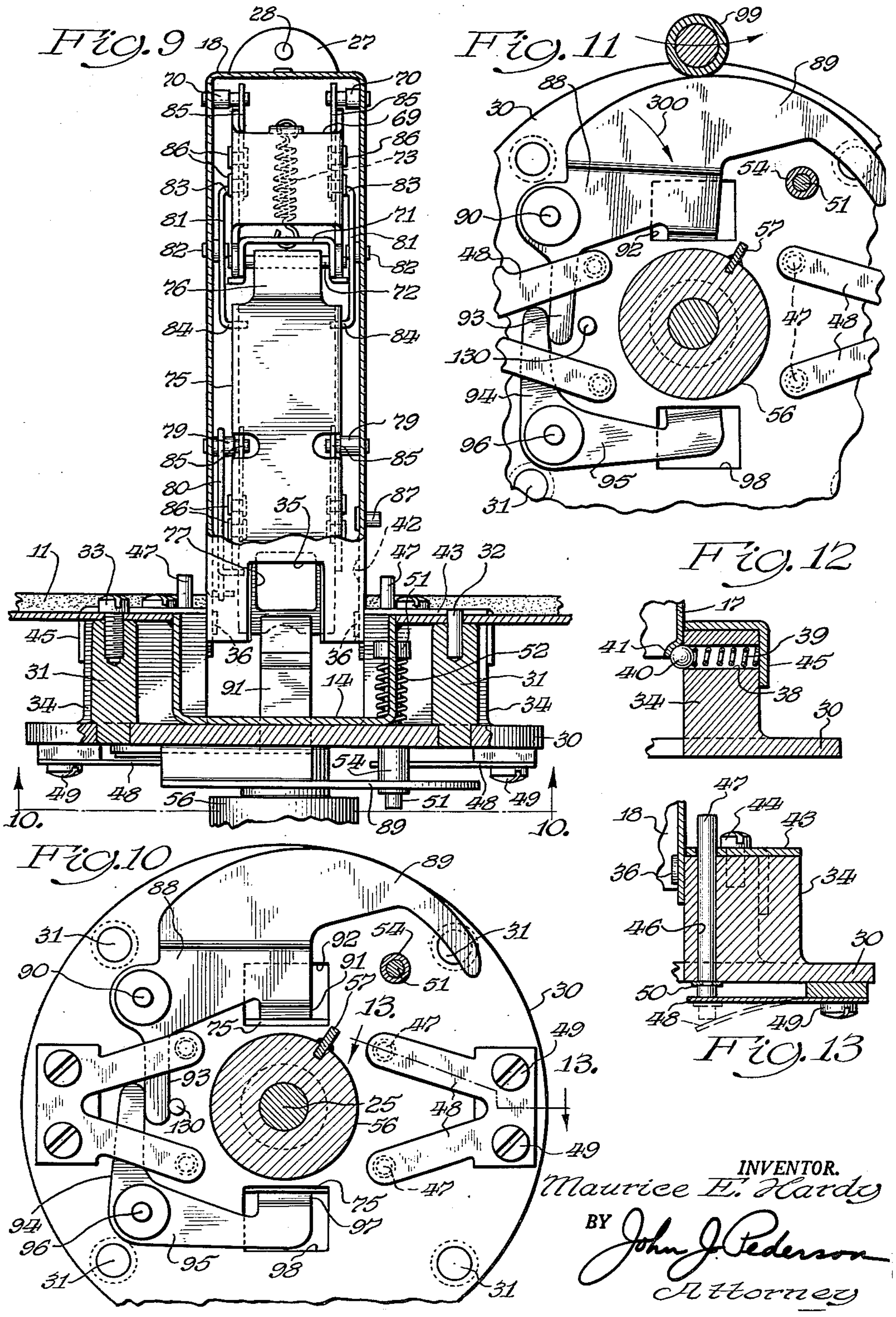
FIGURE 9 is a fragmentary elevation view, partly in cross-section, taken along the line 9—9 of FIGURE 4.
FIGURE 10 is a fragmentary view, partly in cross-section, taken along the line 10—10 of FIGURE 9.
FIGURE 11 is a fragmentary view, partly in cross-section, illustrating an operational phase of the structure depicted in FIGURE 10.
FIGURE 12 is a fragmentary cross-sectional view taken along the line 12—12 of FIGURE 3.
FIGURE 13 is a fragmentary cross-sectional view taken along the line 13—13 of FIGURE 10.

As shown in FIGURE 4, a base plate 30 maintains fixed support posts 31 which cooperate with aligning pins 32 and fasteners 33 to support platen 12. Automatic spindle sections 17 and 18 are relieved or cut away at the base, as shown at 35, to provide clearance for the operating mechanism upon retraction. Sections 17 and 18 are pivotally mounted to turntable unit 10 by axles 36 journalled in a pair of upstanding pedestals 34 on opposite sides of spindle 25, only one of the pedestals being visible in FIGURE 4; the pivotal mounting is more fully illustrated in FIGURE 8. Also included within pedestals 34, as shown in FIGURE 3, are respective channels 38 each of which contains a spring 39 and a ball 40 which cooperate with indentations 41 when sections 17, 18 are vertically positioned and with indentations 42 when sections 17, 18 are horizontal to detent the spindle sections in extended or retracted condition. Cover members 43, more clearly visible in FIGURE 1, are secured to pedestals 34 by fasteners 44 to clamp axles 36 of sections 17, 18 within the journal cavities of pedestals 34 and include depending flanges 45 which retain springs 39 of the abovementioned detent mechanism within channels 38, as shown in FIGURES 3 and 12. Pedestals 34 also include vertical passages 46 which slidably receive additional indexing means comprising respective elongated pins 47 depressably resting upon spring fingers 48 secured to base plate 30, as will be more fully explained in connection with FIGURE 13. Each indexing pin 47 includes a collar 50 normally bearing against the under side of base plate 30. FIGURE 4 also shows the manner in which the automatic spindle 16 is structurally correlated with those portions of the record changing assembly 15 disposed beneath turntable unit 10. The lower extremities of sections 17, 18 are cooperatively interconnected by the mutually geared segments 55 which are radially disposed about axles 36. A pinion 56 having a paraxial peripheral ridge 57 is fixed to base plate 30 and depends therefrom. The lower extremity of spindle 25 extends through pinion 56, is secured therein by set screws 58, and is journalled at 59 in a fixed bearing 60 supported by a bottom plate 61 having upended portions 62 secured to the under side of mounting base 63. The record-changing mechanism 15 includes a mutilated-gear cam wheel 64 rotatably mounted upon a shaft 66 fastened to plate 61. A velocity trip mechanism 67, to be described in detail subsequently, is disposed at the outer periphery of cam wheel 64 adjacent the mutilated portion 65. A decoupling pin 51, biased upwardly by a spring 52 against the shoulder 53 in a side wall of recess 14 and axially guided within a thrust bearing 54 secured to the under side of base plate 30, is provided for disabling the record-changing mechanism during manual operation. The other structural aspects of the driving system for the automatic spindle 16 will be discussed in conjunction with FIGURE 14.

As shown in FIGURE 4, a stack of record discs 68 is disposed upon the automatic spindle 16, while an individual record disc 100 is shown in descent and also at rest upon surface 11. The separate spindle sections 17 and 18 each include a combination record disc support and separator blade assembly comprising a U-shaped pivotal element 69 rotatably mounted upon the pivots 70. Element 69 has a displaceable blade 71 which is rotatably biased about a bar 72 by a bias spring 73. Each of sections 17, 18 further comprises a shoulder 75, also U-shaped, disposed below the combination support blade assembly. The upper extremity of shoulder 75 is provided with an offset ledge 76 which terminates beneath blade 71 a distance substantially equal to the thickness of a record disc of the type stored in stack 68, while the lower extremity of shoulder 75 is provided with an aperture 77. Shoulders 75 are rotatably mounted upon intermediate pivots 79 and are normally biased by a restoring spring 80 so as to urge ledge 76 inwardly against bar 72. Coupling levers 81 are rotatably mounted on fixed pins 82 and are provided with upper tabs 83 which cooperate with openings 74 in elements 69 and lower tabs 84 engaging openings 78 in shoulders 75. Brackets 85 fastened by rivets 86 secure elements 69 and shoulders 75 about pivots 70 and 79, respectively.

Figures 5, 6, 7, 8:
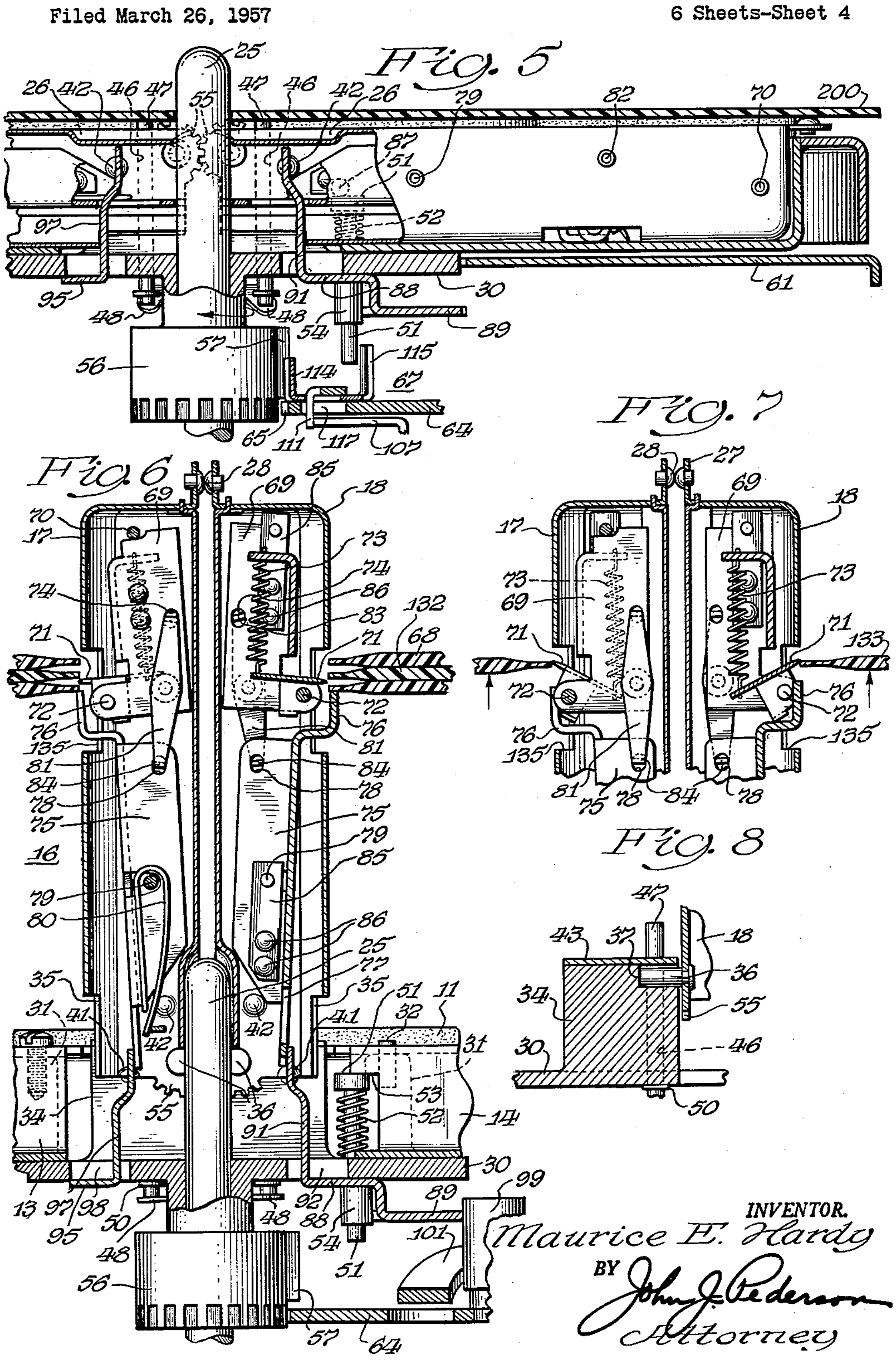
FIGURE 5 is a fragmentary elevation view, partly in cross-section, taken along the line 5—5 of FIGURE 2.
FIGURE 6 is a fragmentary elevation view, similar to that of FIGURE 4, illustrating the first operational phase of the automatic spindle.
FIGURE 7 is a fragmentary cross-sectional view of the upper portion of the automatic spindle shown in FIGURE 6 showing the spindle operation which accompanies record disc removal.
FIGURE 8 is a fragmentary cross-sectional view taken along the line 8—8 of FIGURE 3.

FIGURE 5 shows the apparatus with the spindle sections 17 and 18 retracted below the record supporting surface 11 to permit manual playing of record discs of any type. In the retracted position, spindle sections 17 and 18 are received within turntable recesses 13 and 14, respectively, exposing spindle 25 for receiving a small-aperture record disc 200 such as the commonly available 78 r.p.m. and 33⅓ r.p.m. records. As shown in FIGURE 5, when a small apertured disc 200 is centered on the turntable by means of spindle 25, pins 47 are depressed by the weight of the record; on the other hand, these same pins are urged upwardly by springs 48 and may therefore be employed to index a large-aperture record disc for manual playing if desired.

FIGURE 5 also illustrates the manner in which decoupling pin 51 is actuated to disengage the record changing mechanism during manual operation of the unit. A cam 87, which may be in the form of an outwardly protruding pin fixed to the shell of spindle section 18, contacts the upper surface of de-coupling pin 51, depressing the latter against the restoring force of spring 52 when spindle section 18 is received within turntable recess 14. The structural relationship of pin 51 to the record changing mechanism and the manner in which disengagement of the latter is effected by depression of pin 51 are discussed hereinafter in greater detail.

FIGURE 6 is a view similar to that of FIGURE 4 showing the structural relationship of the components of automatic spindle 16 during an intermediate stage in the record changing cycle and will be considered in detail in the discussion of the operation of spindle 16 for storing and dispensing large-aperture record discs.

FIGURE 7 is a fragmentary view depicting the operation of the automatic spindle to permit withdrawal of one or more records from the turntable unit, while FIGURE 8 illustrates the details of the pivotal mounting of spindle section 18 to the turntable unit. FIGURE 9 is a cross-sectional view, at right angles to those of FIGURES 4, 6 and 7, showing certain of the operating elements in greater detail and further illustrating cam 87 for actuating de-coupling pin 51.

FIGURES 10 and 11 show the apparatus for actuating automatic spindle 16. A rocker 88 having an upset cam surface 89 is rotatably secured about a fixed axis 90 extending downwardly from the underside of base plate 30. Rocker 88 maintains an upended offset tongue 91 which protrudes through a first base plate aperture 92 and laterally engages the outer surface of the shoulder 75 associated with section 18 when the latter is extended for automatic operation. Rocker 88 further includes a crank extension 93 in intimate contact with the crank element 94 of a driven arm 95 likewise fixed to base plate 30 upon a fixed axis 96. Driven arm 95 also includes an upended offset tongue 97 which passes through a second base plate aperture 98 and cooperates in like manner with the shoulder 75 affiliated with section 17. Cranks 93, 94 are normally urged against a stop 130 by the spring bias applied to shoulders 75. As shown in FIGURE 11, rocker 88 is driven by an actuating post 99, fixed to cam wheel 64, at an appropirate time during the record-changing cycle, to initiate the desired record-dispensing action of spindle 16.

FIGURE 12 shows the manner in which the spindle sections are detented in the raised position for automatic operation with large-aperture record discs, while FIGURE 13 illustrates the construction and operation of indexing pins 47 to permit manual playing of either small-aperture or large-aperture discs when the spindle sections are retracted within the turntable recesses.

Figures 14, 15, 16:
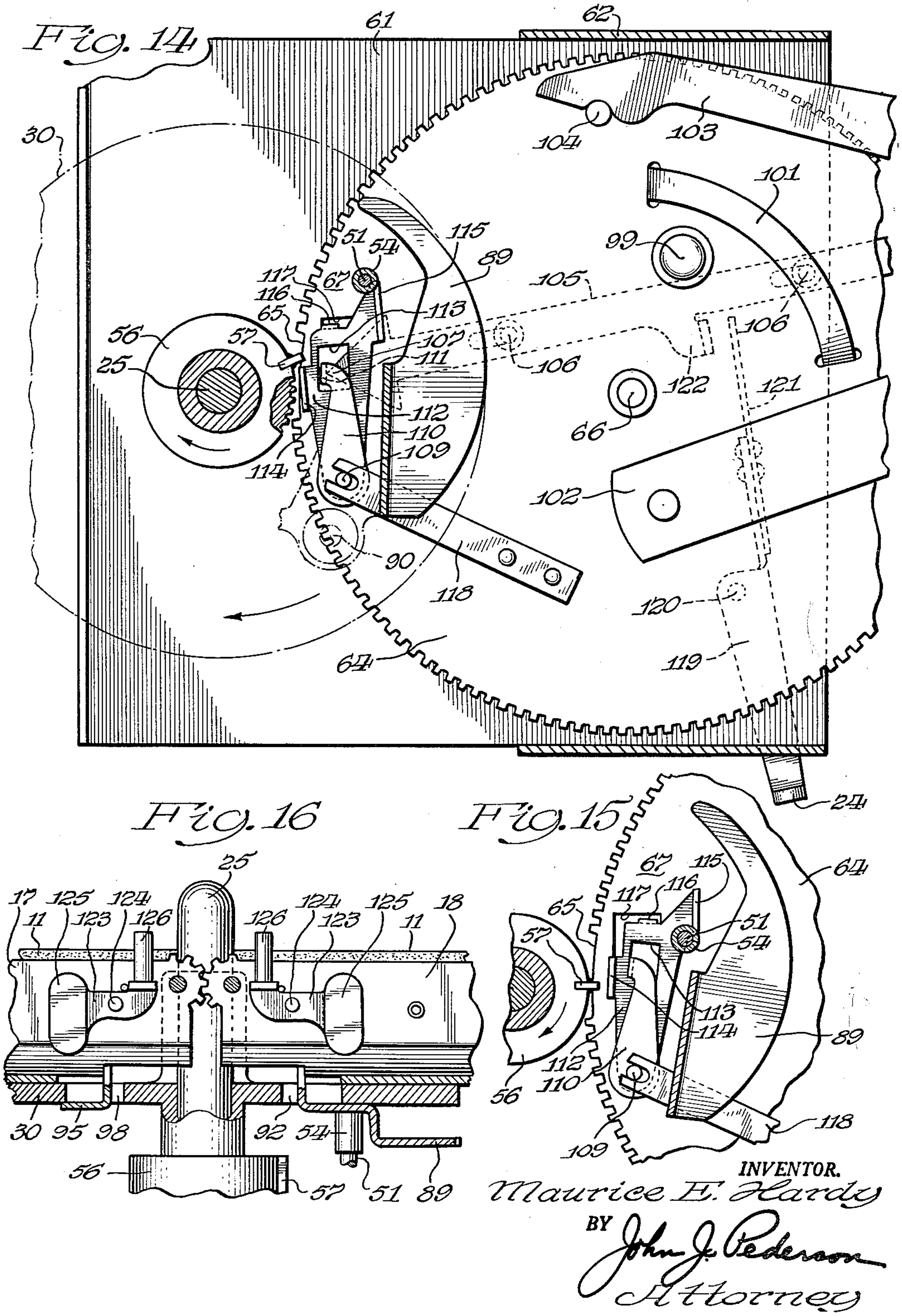
FIGURE 14 is a fragmentary view, partly in section, taken along the line 14—14 of FIGURE 4.
FIGURE 15 is a fragmentary view of a portion of FIGURE 14.
FIGURE 16 is a fragmentary view, partly in section, illustrating counter balanced auxiliary indexing means.

As shown in FIGURE 14, in which the mechanism is shown in the position immediately after operation of the velocity trip mechanism at the beginning of a record-changing cycle, cam wheel 64 is provided with peripheral mutilation 65 and carries a tone-arm raising cam 101, a tone arm positioning lever 102, and an inwardly spring-biased friction pawl 103, externally pivoted to bottom plate 61 (not shown), which cooperatively engages an indexing knob 104. A slotted tone arm actuated carriage 105 is slidably secured to the under surface of bottom plate 61 by snapring units 106. Carriage 105 is provided with an offset lip 107 which extends upwardly through a window 108 in bottom plate 61 as best seen in FIGURE 4. The velocity trip mechanism 67 is swiveled upon a pintle 109 and comprises a driving piece 110 having a depending ear 111 which is frictionally coupled to a trip member 112 provided with a slot 113, a coupling tab 114, and a decoupling tab 115. A limit finger 116 depends from trip member 112 within the substantially rectangular cavity 117 of cam gear 64. A bifurcated spring latch 118, fixed to cam gear 64, engages pintle 109 and insures frictional engagement between driving piece 110, trip member 112 and cam gear 64. An interrupting lever 119 culminating in reject toggle 24 is pivoted at 120 to bottom plate 61 and includes an extension 121 which can engage a stubshaft 122 of carriage 105. These elements may all be of conventional construction and, accordingly, a more detailed description is not required.

FIGURE 16 illustrates alternative indexing means comprising counterbalanced depressable record indexing members 123 (only two shown) pivotally secured to the shells of spindle sections 17, 18, at 124, each member including a balancing head 125 and an indexing rod 126. Indexing elements 123 are, as illustrated, in operable indexing position when spindle sections 17, 18 are retracted within recesses 13, 14; when spindle sections 17 and 18 are raised for automatic operation, indexing members 123 are, of course, automatically retracted and the large-aperture discs are indexed in playing position by the base of spindle 16.

*Operation*

In operation, spindle sections 17 and 18 may be elevated to provide for automatic record changing with large-aperture discs, as shown in FIGURE 1, or retracted within recesses 13 and 14 for manual playing of any commercially available record disc, as shown in FIGURE 2. In the retracted position shown in FIGURE 2, spindle sections 17 and 18 are stored below record supporting surface 11, and conventional spindle 25 is exposed to index small-aperture discs; indexing of large-aperture discs for manual playing is provided by spring-biased pins 47 which are depressed automatically by the weight of the record when a small-aperture disc is placed on the turntable. For automatic 45-r.p.m. operation, either of the spindle sections 17 and 18 is manually elevated to an upright posion; the other spindle section is automatically raised through the action of the mutually geared segments 55 (FIGURES 4 and 5). Stop buttons 28 comprise an extension of the record supporting surface 11 when in the retracted position and effectively prevent sections 17 and 18 from over traveling when extended. Sections 17 and 18 are releasably captivated in the upright position through the action of the detent mechanism illustrated in FIGURE 12 wherein ball 40 is resiliently urged by spring 39 against indentation 41 positioned at the lower extremity of section 17; a corresponding detent action is provided by balls 40 and indentations 42 when the spindle sections are retracted, as shown in FIGURE 5.

For automatic operation with large-aperture record discs, the spindle sections are elevated and a stack of records 68 is stored on the upper portion of spindle 16, being supported by blades 71, as shown in FIGURE 4. In describing the operation, it will be convenient to commence with the completion of a record such as 100, although it will be readily understood that manual positioning of the first record on the turntable is neither necessary nor conveniently possible with the illustrated mechanism. As the tone arm progresses inwardly, carriage 105 (FIGURE 14) is translated toward the center of the turntable. As the tone arm nears the end of the record-playing cycle, carriage lip 107 contacts depending ear 111, and driving piece 110 and trip member 112 are rotated in a counter-clockwise direction about pintle 109 so as to urge coupling tab 114 tangentially into the circumferential path of ridge 57 as it rotates with driving pinion 56 and turntable unit 10. Velocity trip mechanism 67 operates in a conventional manner in that although driving element 110 is slowly urged inward by tone arm 19, trip member 112 is periodically rotated clockwise about pintle 109 by tangential engagement of tab 114 with ridge 57. However, when the tone arm 19 reaches the conclusion of the record, it is displaced rather sharply by the eccentric groove toward the center of the turntable unit 10 and, as a consequence, carriage 105 imparts a positive impulse to driving piece 110 which in turn carries trip member 112 in a counter-clockwise motion so as to thrust the upper edge of coupling tab 114 into the path of ridge 57. The driving contact between coupling tab 114 and ridge 57 rotates cam wheel 64 upon its shaft 66 and displaces the mutilated portion 65 of cam wheel 64, thereby engaging pinion 56 with the teeth on cam wheel 64 to initiate a record-changing cycle.

The incidents accompanying the raising of tone arm 19, its removal from the path of record disc travel and its positioning to initiate a subsequent recording form no part of this invention and are accomplished by the use of conventional techniques. As cam wheel 64 (see FIGURE 14) rotates in a counter-clockwise direction, indexing pin 104 departs from pawl 103, and cam 101 cooperates with an appropriate mechanism (not shown) to lift tone arm 19 free from record disc 100 while positioning lever 102 transports tone arm 19 from under record disc stack 68. On further rotation of cam wheel 64, a conventional restoring arrangement (not shown) displaces carriage 105 to an initial position corresponding to the repositioned tone arm 19 and returns the velocity trip mechanism 67 to the quiescent position, shown in FIGURE 15.

The manner in which spindle 16 automatically dispenses records onto the turntable will now be described. As cam wheel 64 rotates during the changing cycle, actuating post 99 is brought to bear against the upset cam 89 of rocker 88. This action is vividly illustrated in FIGURE 11. Under the influence of actuating post 99, rocker 88 is rotated clockwise about its axis 90, as indicated by arrow 300, so that its crank extension 93 cooperating with crank element 94 impels driven arm 95 in a counter-clockwise direction. Referring to FIGURE 10 wherein rocker 88 and driven arm 95 are normally positioned with crank extension 93 disposed against stop 130 and then adverting to the action depicted in FIGURE 11, it is seen that the offset tongues 91 and 97 of rocker 88 and driven arm 95, respectively extending through base plate apertures 92 and 98, are displaced inwardly. This displacement of tongues 91 and 97 (FIGURE 6) operates to rotate shoulders 75 about pivots 79 against the restoring action of spring 80 to displace the ledges 76 outwardly through cut-outs 135. Simultaneously, coupling levers 81 coact with shoulders 75 and with pivotal elements 69 to rotate elements 69 about pivots 70 so as to withdraw blades 71 from beneath record disc stack 68 into cut-outs 135. This operational phase comprises the first step in the record-dispensing cycle; as shown in FIGURE 6, rocker 88 and driven arm 95 have reached their inward limit under the influence of actuating post 99. The second phase of the record-dispensing cycle commences as actuating post 99 departs from upset cam 89 permitting rocker 88 and driven arm 95 to return to their normal positions under the influence of shoulders 75 which are normally biased by restoring spring 80. Following this transition and referring from FIGURE 6 to FIGURE 4 it is apparent that as shoulders 75 pivot to their normal positions, blades 71 extend under the inner periphery of the penultimate record disc 132 thereby permitting the bottom disc 100 to descend to record-supporting surface 11. Cam wheel 64 is now returned to its starting position with mutilated portion 65 adjacent pinion 56. Possible overrun of cam wheel 64 is precluded by the engagement of pawl 103 with indexing knob 104 thereby preventing recurrent cycling. Tone arm positioning lever 102 operates in a conventional manner in conjunction with cam 101 to position tone arm 19 for reproduction of a subsequent record disc.

Upon completion of the last record disc from stack 68 or when it is desired to remove one or more records from the turntable, the discs can be firmly grasped at their outer peripheries and lifted from the spindle. The record dispensing apparatus disposed within sections 17 and 18 of spindle 16 does not impede such removal since, as shown in FIGURE 7, blades 71 are rotatably displaceable about bar 72. Upon passage of the record discs the action of bias springs 73 returns blades 71 to their normal positions for supporting a new stack of record discs.

For manual operation with any presently available type of record disc, sections 17 and 18 are pivotally retracted within recesses 13 and 14 respectively, as shown in FIGURE 2; the automatic spindle sections are detented in the retracted position by engagement of spring biased balls 40 with indentations 42 as shown in FIGURE 5. Retraction of sections 17 and 18 reveals relieved portions 26 which encompass the small diameter spindle 25 when automatic spindle 16 is utilized. The unit is now ready for manual operation at any of the standard speeds, i.e., 16, 33⅓, 45 or 78 r.p.m. Should it be desired to manually play a large-aperture record disc it is only necessary to position the record disc about the spring-biased auxiliary indexing pins 47; although FIGURE 3 shows sections 17, 18 in the upright position, this view clearly shows the manner in which pins 47 index large-aperture record disc 29. When it is desired to play a small-aperture record disc, mere placement of the disc upon spindle 25 depresses pins 47 as shown in FIGURE 5.

Upon retraction of spindle sections 17 and 18 for manual operation, outwardly extending cam 87 depresses decoupling pin 51 as shown in FIGURE 5. Decoupling pin 51, being fixed to turntable unit 10, rotates with pinion 56. Accordingly as carriage 105 progresses inwardly with the inward movement of the tone arm, decoupling pin 51 engages decoupling tab 115 to remove tab 114 from the path of ridge 57 during each rotation of pinion 56. The initial engagement of decoupling pin 51 with tab 115 is shown in FIGURE 14. On further clockwise rotation of the turntable unit including pinion 56, pin 51 urges trip member 112 clockwise about pintle 109; jamming is precluded since drive member 110 is free to rotate counter-clockwise about pintle 109 in response to inward pressure from carriage 105, due to the friction-clutch coupling between members 110 and 112. Trip member 112 is thus withheld from counter-clockwise rotation until after passage of ridge 57, as is readily apparent from FIGURE 15 which shows the relative positions of the parts at an instant immediately prior to disengagement of pin 51 from tab 115. Since pin 51 is always depressed during manual operation, the decoupling action is repeated during each rotation of turntable unit 10, and cycling of the record-changing mechanism is effectively precluded.

The alternative indexing means represented in FIGURE 16 can be substituted for the previously described spring-biased pins 47. Counter balance elements 123 comprise indexing rods 126 for large-aperture record discs and which are depressable below record supporting surface 11 under the weight of a small-aperture record disc. Balancing head 125 is so weighted as to give way under the influence of a small-aperture record disc but restores indexing rods 136 to the indexing position upon removal thereof. With this construction, indexing of the large-aperture record discs on the turntable during automatic operation is provided entirely by automatic spindle 16.

The invention thus provides a novel record disc indexing and dispensing mechanism which can be incorporated within a portable record player for reproducing information from any of the standard record discs manually or from enlarged-aperture discs automatically. The novel automatic spindle 16 herein described obviates the shortcomings of demountable adaptors by the use of a mechanically sound and commercially feasible construction. Furthermore, additional indexing means may be provided for manually indexing 45 r.p.m. record discs if desired. Moreover, the automatic spindle operating mechanism is itself unique in its simplicity, ease of construction, and economy of manufacture.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a phonograph for reproducing information from record discs, the improvement comprising: a rotatable turntable unit having a record supporting surface provided with a recess; a record changing assembly including a spindle structure pivotally mounted to rotate about an axis parallel to said record supporting surface and retract within said recess and record supporting and dispensing elements within said spindle structure for storing said record discs above said turntable unit and individually dispensing them onto said record supporting surface while in a raised position.

2. A phonograph for reproducing information from record discs comprising: a rotatable turntable unit having a record supporting surface provided with a plurality of radially extending recesses; and a record changing assembly including an automatic spindle for storing said record discs above said turntable unit and individually dispensing them onto said record supporting surface, said spindle comprising record supporting and dispensing elements contained within a corresponding plurality of separate spindle sections pivotally fixed to a central portion of said turntable unit for retraction within said recesses in said supporting surface.

3. A phonograph for alternatively reproducing information from record discs of a first type characterized by a small indexing aperture and from record discs of a second type characterized by a large indexing aperture, comprising: a rotatable turntable unit having a record supporting surface provided with a plurality of radially extending recesses; a record changing assembly including an automatic large-diameter spindle for storing record discs of said second type above said turntable and individually dispensing said discs onto said record supporting surface, said spindle comprising a corresponding plurality of separate sections pivotally fixed to a central portion of said turntable unit and respectively retractable within said recesses and extendable to an operative position above said surface; and additional means, comprising a small-diameter spindle coaxially fixed to said turntable unit and encompassed by said automatic spindle sections when extended to said operative position, for indexing record discs of said first type when said sections are retracted within said recesses.

4. A phonograph according to claim 3, in which said separate spindle sections are mutually geared for simultaneous extension and retraction.

5. A phonograph according to claim 3 and further comprising detent means for latching said spindle sections in either of the extended and retracted positions.

6. A phonograph for alternatively reproducing information from record discs of a first type characterized by a small indexing aperture and from record discs of a second type characterized by a large indexing aperture, comprising: a rotatable turntable unit having a record supporting surface provided with a plurality of radially extending recesses; a record changing assembly including a cycling mechanism and an automatic large diameter spindle for storing record discs of said second type above said turntable and individually dispensing said discs onto said record supporting surface, said spindle comprising a corresponding plurality of separate sections pivotally fixed to a central portion of said turntable unit and respectively retractable within said recesses and extendable to an operative position above said surface; additional means, comprising a small-diameter spindle coaxially fixed to said turntable unit and encompassed by said automatic spindle sections when extended to said operative position, for indexing record discs of said first type when said sections are retracted within said recesses, and decoupling means for deactivating said cycling mechanism upon retraction of said sections within said recesses.

7. A phonograph according to claim 6, in which said decoupling means includes an element carried by said turntable unit in normally decoupled relation to said cycling mechanism, and a cam fixed to one of said spindle sections for moving said element into engagement with said cycling mechanism upon retraction of said spindle sections into said recesses.

8. A phonograph for alternatively reproducing information from record discs of a first type characterized by a small indexing aperture and from record discs of a second type characterized by a large indexing aperture, comprising: a rotatable turntable having a record supporting surface provided with a plurality of radially extending recesses; a record changing assembly including an automatic spindle for storing record discs of said second type above said turntable and individually dispensing said discs onto said record supporting surface, said spindle comprising a corresponding plurality of pivotally mounted separate sections centrally disposed with respect to said turntable and retractable to an inoperative position within said recesses and extendable to an operative position above said surface; secondary indexing means comprising a small-diameter spindle coaxially disposed with respect to said turntable and encompassed by said spindle when said members are extended to said operative position for indexing record discs of said first type when said members are retracted to said inoperative position; and means including a plurality of auxiliary indexing elements disposed about said small-diameter spindle and normally extending above said record supporting surface for indexing record discs of said second type when said spindle sections are retracted to said inoperative position, but depressable at least to the level of said surface to permit indexing of record discs of said first type by said small-diameter spindle.

9. A phonograph according to claim 8 in which said auxiliary indexing elements are normally spring-biased to extend above said record supporting surface, and in which the weight of a single record disc of said first type is sufficient to overcome said spring-bias and depress said auxiliary elements at least to the level of said record supporting surface.

10. A phonograph according to claim 8, in which said auxiliary indexing elements are pivotally fixed to said spindle sections.

11. A phonograph according to claim 10, in which said auxiliary elements are counterbalanced about their pivot points to normally extend above said record supporting surface when said spindle sections are retracted but are depressable at least to the level of said surface under the weight of a single record disc of said first type.

12. A phonograph for alternatively reproducing information from record discs of a first type characterized by a small indexing aperture and from record discs of a second type characterized by a large indexing aperture comprising: a rotatable turntable unit having a record supporting surface provided with a plurality of radially extending recesses; a record changing assembly including an automatic large diameter spindle for storing record discs of said second type above said turntable unit and individually dispensing said discs onto said record supporting surface, said spindle comprising a corresponding plurality of separate sections pivotally fixed to a central portion of said turntable unit and respectively retractable within said recesses and extendable to an operative position above said surface; said spindle further comprising: a plurality of combination record disc support and separator blades normally positioned to engage the periphery of the lowermost record disc of a stack of second type record discs and displaceable to an operated position in which said blades are withdrawn from the path of travel of said record discs from said stack to said turntable; a plurality of support shoulders disposed below said blades a distance substantially equal to the thickness of one of said second type record discs, normally positioned free from the path of travel of said second type discs from said stack to said turntable and displaceable to an operated position, in which said shoulders receive said stack of second type record discs from said blades; actuating means for displacing said blades and said shoulders from said normal positions to said operating positions to drop said record stack from said blades to said shoulders, biasing means for returning said blades and said shoulders to said normal positions, whereby said blades engage the penultimate record of said stack and the lowermost record of said stack is deposited on said record supporting surface; and additional means, comprising a small diameter spindle coaxially fixed to said turntable unit and encompassed by said automatic spindle sections when extended to said operating position, for indexing records of said fisrt type when said sections are retracted within said recesses.

13. A phonograph for alternatively reproducing information from record discs of a first type characterized by a small indexing aperture and from record discs of a second type characterized by a large indexing aperture, comprising: a rotatable turntable unit having a record supporting surface provided with a plurality of radially extending recesses; a record changing assembly including an automatic large-diameter spindle for storing record discs of said second type above said turntable and individually dispensing said discs onto said record supporting surface, said spindle comprising a corresponding plurality of separate sections pivotally fixed to a central portion of said turntable unit and respectively retractable within said recesses and extendable to an operative position above said surface; said spindle further including a plurality of combination record disc support and separator blades normally positioned to engage the periphery of the lowermost disc of a stack of second type record discs and displaceable to an operated position and which blades are withdrawn from the path of travel of record discs from said path to said turntable, each of said blades comprising a pivotal element including a displaceable shelf normally positioned in said path of travel of said record discs from said stack to said turntable to support said record discs, but displaceable from said path of travel to permit removal of said record discs from said spindle; a plurality of pivoted support shoulders disposed below said combination blades a distance substantially equal to the thickness of one of said record discs, said shoulders normally positioned free from the path of travel of said discs from said stack to said turntable and displaceable to an operated position in which said shoulders receive said stack of discs from said combination blades; actuating means disposed beneath said turntable surface for pivotally displacing said shoulders from their normal position to their operated position to withdraw said blades from beneath said stack and drop said stack onto said shoulders; a plurality of coupling levers intercoupling said pivotal elements and said shoulders and responsive to displacement of said shoulders from their normal position to their operated position for displacing said pivotal elements from their normal position to their operated position; biasing means for returning said shoulders from their operated position to their normal position, whereby said blades engage the penultimate record of said stack and said lowermost record is deposited on said record supporting surface; and additional means, comprising a small-diameter spindle coaxially fixed to said turntable unit and encompassed by said automatic spindle sections when extended to said operative position, for indexing record discs of said first type when said sections are retracted within said recesses.

14. In a record changing phonograph, a turntable, a spindle extending upwardly therefrom and divided into a number of sections, which are pivotally mounted on said turntable for a swinging movement between a raised operative position, and an outwardly extending inoperative position, recesses in said turntable to receive said spindle sections when in said inoperative position and record supporting and dispensing elements contained within said spindle sections for dispensing records one at a time to said turntable.

15. In a phonograph for alternatively reproducing information from record discs of a first type characterized by a small indexing aperture and from record discs of a second type characterized by a large indexing aperture, the improvement comprising: a rotatable turntable unit having a record supporting surface provided with a plurality of radially extending recesses; a large-diameter spindle for storing record discs of said second type above said turntable and individually dispensing said discs onto said record supporting surface, said spindle comprising a corresponding plurality of separate sections pivotally fixed to a central portion of said turntable unit and respectively retractable within said recesses and extendable to an operative position above said surface; and additional means, comprising a small-diameter spindle coaxially fixed to said turntable unit and encompassed by said spindle sections when extended to said operative position, for indexing record discs of said first type when said sections are retracted within said recesses.

References Cited in the file of this patent

UNITED STATES PATENTS

| | | |
|---|---|---|
| 2,594,246 | Ten Cate | Apr. 22, 1952 |
| 2,643,127 | Gregg et al. | June 23, 1953 |
| 2,688,490 | Schumaker | Sept. 7, 1954 |
| 2,761,686 | Stalling | Sept. 4, 1956 |
| 2,971,763 | Staar | Feb. 14, 1961 |